United States Patent
Ribarich

(10) Patent No.: US 7,408,307 B2
(45) Date of Patent: Aug. 5, 2008

(54) BALLAST DIMMING CONTROL IC

(75) Inventor: Thomas J. Ribarich, Laguna Beach, CA (US)

(73) Assignee: International Rectifier Corporation, El Segundo, CA (US)

( * ) Notice: Subject to any disclaimer, the term of this patent is extended or adjusted under 35 U.S.C. 154(b) by 105 days.

(21) Appl. No.: 11/063,404

(22) Filed: Feb. 22, 2005

(65) Prior Publication Data

US 2005/0184682 A1    Aug. 25, 2005

Related U.S. Application Data

(60) Provisional application No. 60/546,520, filed on Feb. 19, 2004.

(51) Int. Cl.
*G05F 1/00* (2006.01)

(52) U.S. Cl. .................. 315/291; 315/307; 315/209 R; 315/194; 315/DIG. 4; 315/224

(58) Field of Classification Search ............. 315/209 R, 315/291, 194, 307, 224, 244, DIG. 4, DIG. 7; 363/17, 98; 323/212, 215, 235, 241, 242
See application file for complete search history.

(56) References Cited

U.S. PATENT DOCUMENTS

| | | | | |
|---|---|---|---|---|
| 5,615,093 A | | 3/1997 | Nalbant | 363/25 |
| 5,798,620 A | * | 8/1998 | Wacyk et al. | 315/307 |
| 6,008,593 A | * | 12/1999 | Ribarich | 315/307 |
| 6,801,028 B2 | * | 10/2004 | Kernahan et al. | 323/283 |
| 6,807,070 B2 | * | 10/2004 | Ribarich | 363/17 |
| 6,891,339 B2 | * | 5/2005 | Ribarich et al. | 315/291 |
| 6,949,888 B2 | * | 9/2005 | Ribarich | 315/291 |
| 2003/0006720 A1 | | 1/2003 | Borella et al. | 315/291 |

OTHER PUBLICATIONS

International Rectifier Data Sheet No. PD60194_A for IR21592(S) and IR21593(S), www.irf.com, 25 pages, Nov. 13, 2003.

* cited by examiner

*Primary Examiner*—Haissa Philogene
(74) *Attorney, Agent, or Firm*—Ostrolenk, Faber, Gerb & Soffen, LLP

(57) ABSTRACT

An electronic ballast provides dimming control, fault detection and safety features for overcurrent protection and hard switching at a half bridge. A voltage controlled oscillator supplies a switching frequency that is modifiable based on operational feedback parameters. A dimming control signal controls a phase shift between output current and voltage of the half bridge for controlling output power. A feedback circuit senses load current and output voltage to determine fault conditions and to provide control information for adaptively adjusting the frequency of the voltage controlled oscillator. By appropriately controlling the voltage controlled oscillator output, the electronic ballast maintains a zero volt switching with minimum current switching to achieve an efficient and robust electronic ballast control. The entire control function is integrated on a single integrated circuit.

39 Claims, 5 Drawing Sheets

BALLAST DIMMING CONTROL IC

CROSS-REFERENCE TO RELATED APPLICATIONS

This application is based upon and claims priority of U.S. Provisional Application Ser. No. 60/546,520 filed Feb. 19, 2004 (IR-2476 PROV). It is related to Ser. No. 10/664,676 filed Sep. 18, 2003 (IR-2370) and its corresponding U.S. Provisional Application Ser. No. 60/412,621 filed Sep. 19, 2002. The foregoing documents are incorporated by reference.

BACKGROUND OF THE INVENTION

1. Field of the Invention

The present invention relates to a ballast control integrated circuit (IC), and more particularly to a ballast control IC with internal phase control dimming.

2. Related Art

A ballast control IC of background interest is the IR2520 chip manufactured by the International Rectifier Corporation, which is related to the above-referenced Ser. No. 10/664,676. The IR2520 comprises a 600V half-bridge driver for either compact or linear fluorescent lighting applications. With the device, a resonant load is driven by a voltage-controlled oscillator circuit with a programmable minimum frequency as well as other features such as an integrated bootstrap FET, adaptive zero-voltage minimum current switching (ZVMCS), and internal crest factor over-current protection, all integrated in a small 8-pin DIP or SO package.

SUMMARY OF THE INVENTION

For further improvement, the invention provides a dimming ballast controller and the 600V half-bridge drivers and related circuitry integrated into one chip for compact or linear fluorescent lamp applications.

The IC includes internal phase control dimming not requiring extra components for measurement of lamp current, allowing dimming down to below 20% with a high gain, allowing stable operation from a non-regulated DC bus.

Internal crest factor protection is also included to provide shutdown if lamp ignition fails.

The IC has a voltage controlled oscillator with a fixed minimum frequency plus dimming control circuitry with internally fixed minimum phase boundaries. These and other ballast features are integrated in a small 8-pin DIP or SOIC package.

Thus, the described IC preferably has at least the following features: 600V half-bridge driver, integrated bootstrap diode, internal crest factor over-current protection, phase control dimming, 0 to 5VDC dimming control input, micropower startup (150 µA), 15.6V zener clamp on Vcc, automated preheat and start sequence, ignition detection, open circuit and deactivated lamp protection, and a small DIP8/SO8 package.

Other features and advantages of the present invention will become apparent from the following description of an embodiment of the invention which refers to the accompanying drawings.

DETAILED DESCRIPTION OF EMBODIMENTS OF THE INVENTION

Figure 1:
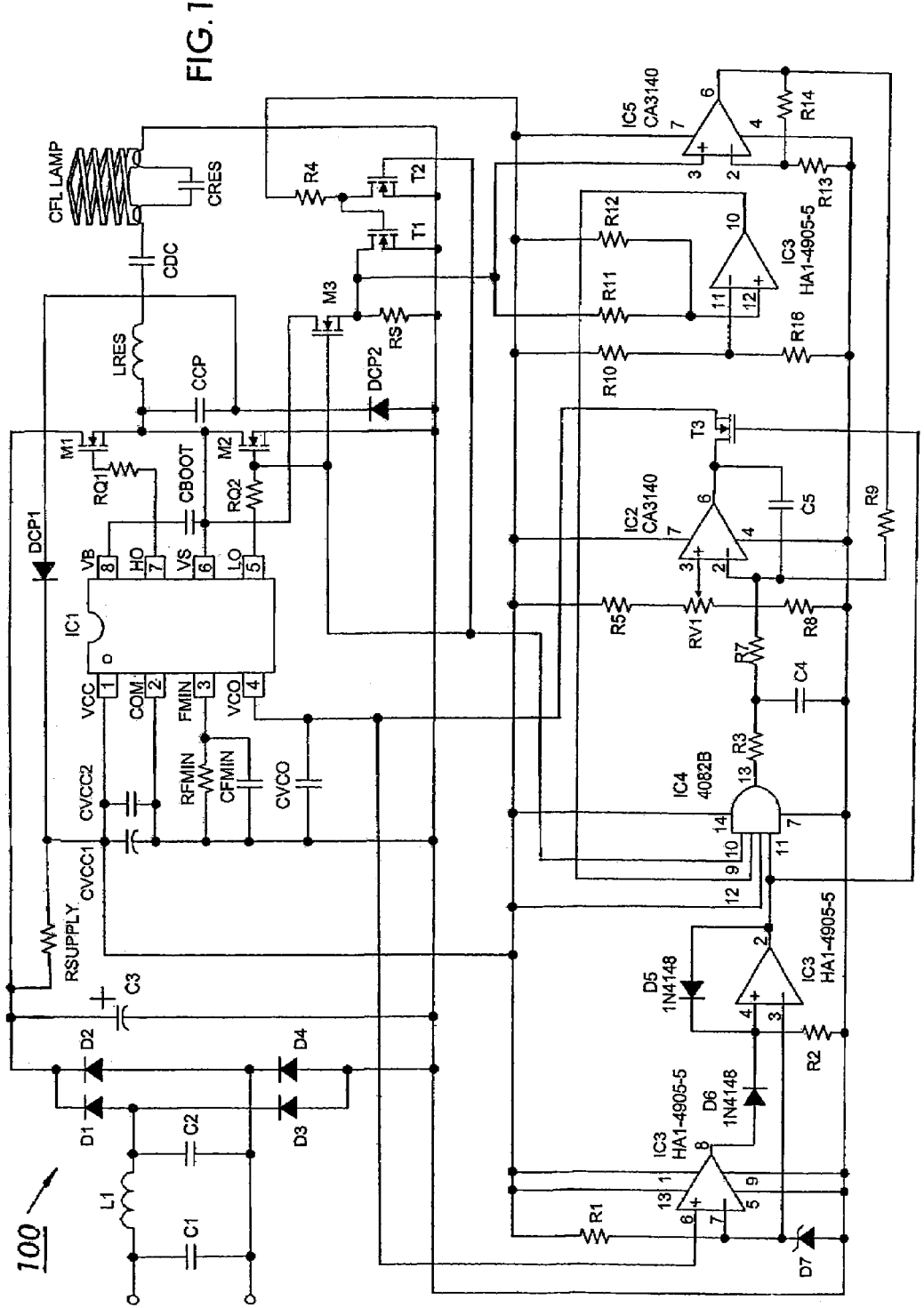
FIG. 1 is an equivalent circuit of an IC according to an embodiment of the invention.
Figure 2:
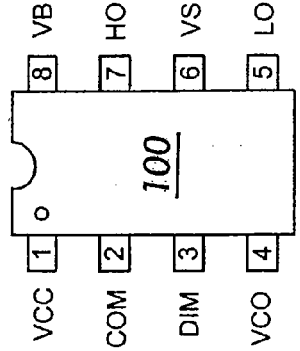
FIG. 2 shows pin assignments of the IC.
Figure 3:
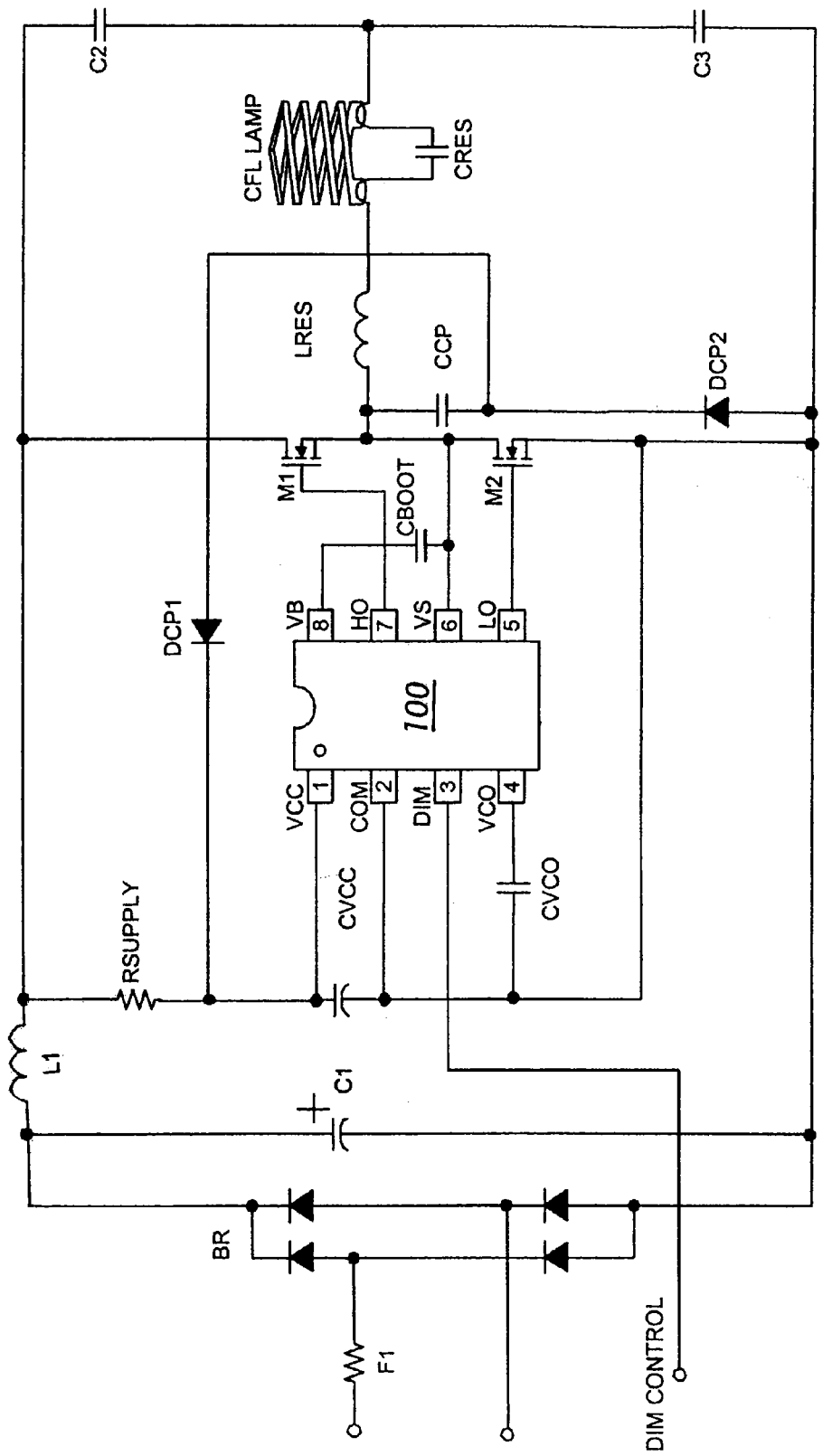
FIG. 3 is a typical application diagram of the IC.

FIG. 1 is a schematic diagram showing an equivalent circuit of a ballast control IC 100 according to an embodiment of the invention. In FIG. 1, IC1 may be a known ballast control IC such as the above-mentioned IR2520. FIG. 2 shows pin assignments and FIG. 3 shows a typical application diagram of the IC 100. Of particular interest is pin #3, which is the dimming control voltage input.

Figure 4:
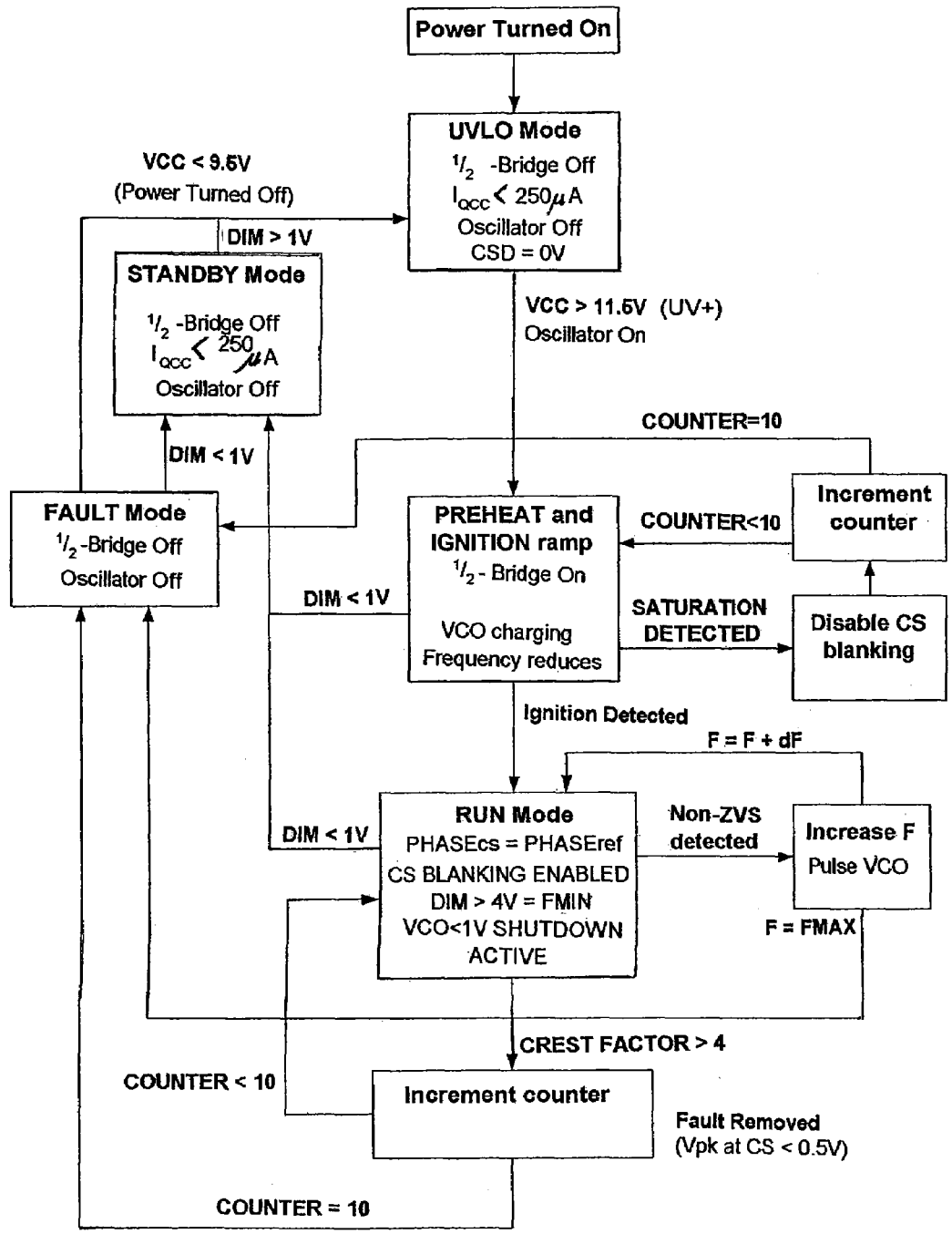
FIG. 4 is a state diagram showing functions of the IC.

FIG. 4 is a state diagram showing functions of the IC 100, which will now be described.

Under-Voltage Lock-Out Mode

The under-voltage lockout mode (UVLO) is defined as the state the IC is in when VCC is below the turn-on threshold of the IC. The under voltage lock-out is designed to maintain an ultralow supply current (<200 µA), and so that the IC is fully functional before the high and low side output drivers are activated.

The start-up capacitor, $C_{VCC}$, is charged by current through supply resistor, $R_{SUPPLY}$, minus the start-up current drawn by the IC. This resistor is chosen to provide sufficient current to supply the IC from the DC bus. $C_{VCC}$ should be large enough to hold the voltage at Vcc above the UVLO threshold for one half cycle of the line voltage as it will only be charged at the peak. Once the capacitor voltage on $V_{CC}$ reaches the start-up threshold, the IC turns on and the HO and LO outputs start oscillating.

Figure 5:
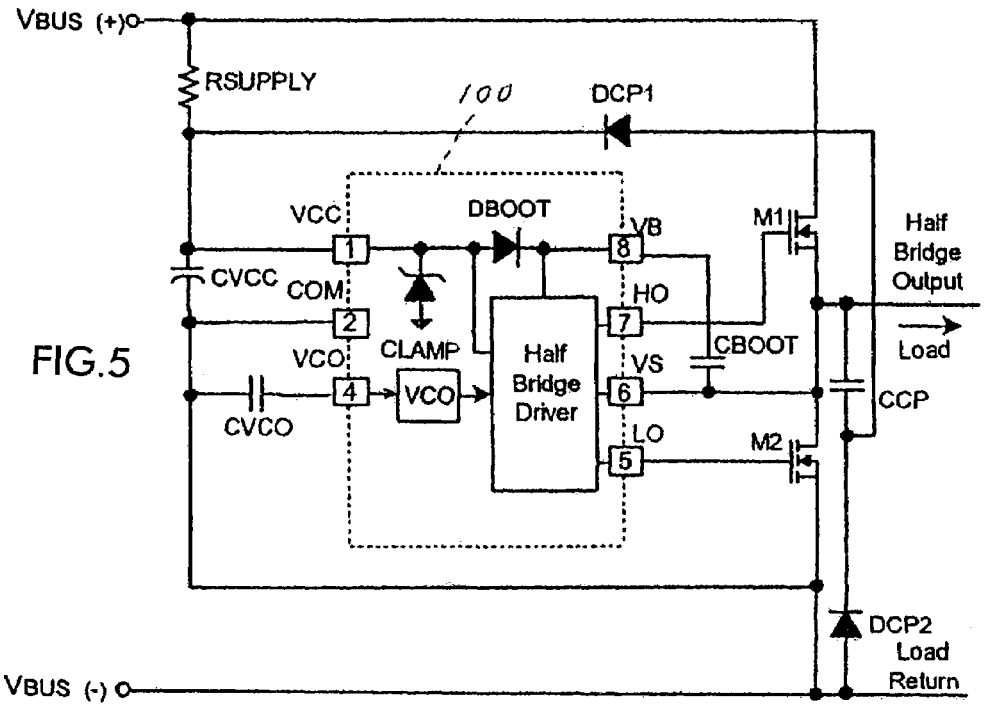
FIG. 5 is a block diagram showing start-up circuitry of the IC.

Referring to FIG. 5 (start-up circuitry), an internal bootstrap diode between $V_{CC}$ on the one hand, and, on the other, VB and the external supply capacitor, $C_{BOOT}$, determine the supply voltage for the high side driver circuitry. The charge pump circuit (FIG. 3) having a capacitor, $C_{CP}$, and two diodes, $D_{CP1}$ and $D_{CP2}$, supplies the voltage for the low side driver circuitry. So that the high-side supply is charged up before the first pulse on pin HO, the first pulse from the output drivers comes from the LO pin.

During UVLO mode, the high-side and low-side driver outputs, HO and LO, are both low and pin VCO is pulled down to COM for resetting the starting frequency to its maximum.

Preheat and Ignition Mode

Figure 6:
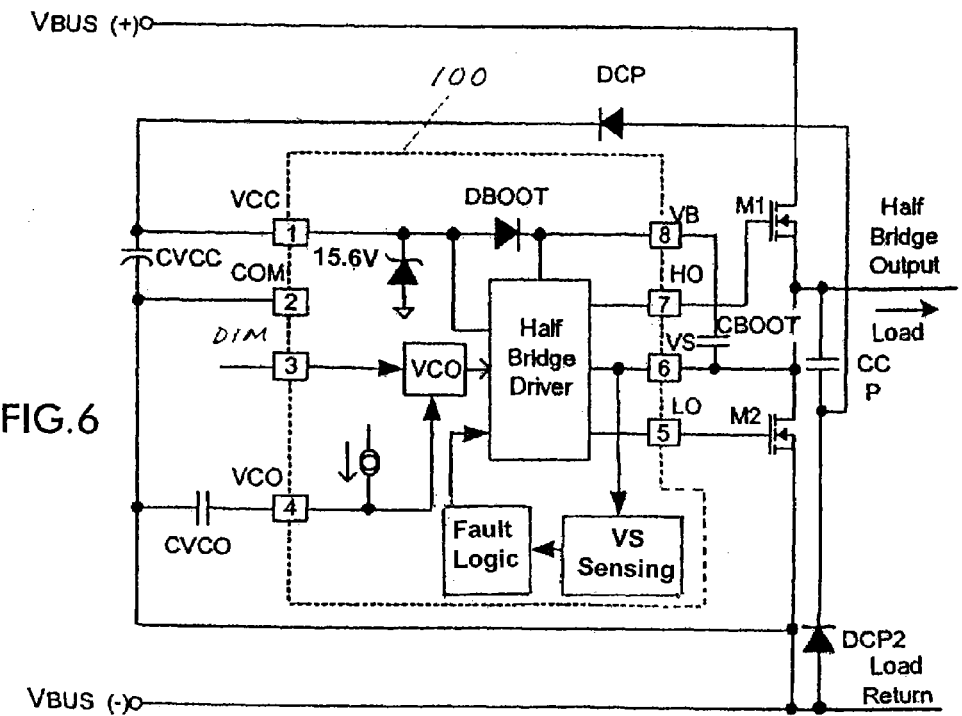
FIG. 6 is a block diagram showing frequency sweep circuitry of the IC.

When VCC exceeds the UVLO positive threshold, the IC starts the frequency sweep mode. Referring to FIG. 6 (frequency sweep circuitry), an internal current source charges the external capacitor on pin VCO, $C_{VCO}$, and the voltage on VCO starts ramping up exponentially. This decreases the frequency, which ramps down towards the resonance frequency of the high-Q ballast output stage, causing the lamp voltage and load current to increase. The frequency keeps decreasing until the lamp ignites or the current limit of the IC 100 is reached (see the Fault Mode section). If the lamp ignites successfully, the ignition detection circuit will cause the IC to go into Run Mode and dimming will be enabled. If the ignition detection does not operate, the voltage on VCO continues to increase until 4.6V and the IC enters Run Mode at that point by default.

The minimum frequency is programmed by an internal reference and is not adjusted externally in this embodiment.

The ballast minimum frequency is preferably below the high-Q resonance so that the frequency ramps through resonance for lamp ignition. The exponential shape of the ramp causes the VCO to ramp quickly through the higher frequencies where the gain across the resonant output stage is low and there is less current available for preheating, and then slower through the lower frequencies as it approaches resonance where the gain is higher and there are higher currents available for preheating.

Run Mode

When the lamp ignites, the output stage becomes a low-Q RCL circuit and the frequency is decreased until the operating point is slightly above resonance.

It is desirable to set the minimum operating frequency as close as possible to the resonance frequency of the low-Q RCL output stage while maintaining zero-voltage switching (ZVS) at the half-bridge. This is because the output current will be almost in-phase with the half-bridge output voltage, resulting in minimum-current switching (MCS) as well. Operating in this mode will minimize the switching losses of the half-bridge MOSFETs. Closed-loop control of this operating point will also provide ZVMCS despite component and lamp tolerances during production, line voltage variations and lamp variations with time.

In Run Mode the phase control dimming function of the IC 100 is enabled. If the voltage at the DIM pin is above 4V the IC will operate at minimum frequency and hence, maximum output. In this condition the ZVMCS circuit will operate as described in Ser. No. 10/664,676, preventing the half bridge from operating in a hard-switching condition.

If the DIM pin voltage is below 4V and above 1V a phase reference will be produced within the IC that will allow adjustment of the VCO pin voltage from within the IC and therefore, frequency adjustment, to provide a phase shift that will match that determined by the reference provided by the DIM pin input voltage. This operation is very similar to that of International Rectifier's IR2159 series of phase control dimming ICs, described in Data Sheet No. PD60194_A (rev. Nov. 13, 2003) available at www.irf.com, incorporated by reference. However, a simpler and more compact circuit is achieved in this case, in that the minimum and maximum phase boundaries are internally set within the IC. Consequently, the range of dimming may not allow adjustment to very low levels, as this would preferably employ precision references to be established outside the IC.

At 1V input at the DIM pin, the ballast will go to its minimum possible level and the output will increase until the maximum is reached at 4V. The characteristic of lamp power against DIM pin voltage will be reasonably linear over this range.

When the DIM input voltage is less than 1V, the IC will shut off until the DIM pin voltage is again raised above 1V. It will then go through the preheat and ignition sequence again.

The adaptive ZVMCS control is achieved by internally sensing the half-bridge output voltage at the VS pin during the non-overlapping deadtime of the half-bridge switches.

During each switching cycle of the half-bridge, the half-bridge voltage slews to the opposite rail during the deadtime. If the voltage has not slewed entirely to the opposite rail such that there is zero voltage across the appropriate switch before turn-on, then the operating frequency is too close to resonance and the frequency is shifted up. This measurement is performed at the turn-on of the low-side MOSFET, minus a small delay (100 ns) for early detection and safe margin. If the voltage has not slewed to zero by this time, then a pulse of current is delivered to the VCO pin, which causes the external capacitor to discharge down slightly and therefore the frequency to increase slightly. The VCO capacitor then charges during the rest of the cycle slowly due to the internal current source. The frequency therefore tends to decrease towards resonance, discharging the VCO capacitor, and the adaptive ZMVCS circuit nudges the frequency back up slightly above resonance when non-ZVS occurs. The circuit then remains in this closed-loop adaptive near-resonance mode during running and enables ZVS and MCS operation with changing line conditions, component tolerance variations and lamp/load variations.

The 600V fabrication process used in the development of this IC allows for the VS pin to be accurately measured with an internal high-voltage MOSFET for zero volts during the non-overlapping deadtime, while withstanding the high DC bus voltage during other portions of the switching cycle when the high-side MOSFET is turned on and VS is at the DC bus potential.

The same sensing system allows the IC to monitor the half-bridge current when the lower MOSFET is on and use its RDS(on) as a current sensing resistor. In this way the zero-crossing of the half bridge current can be detected, which is used as the feedback signal for phase control dimming.

Fault Mode

Should a lamp non-strike condition occur, where the filaments are intact but the lamp does not ignite, the lamp voltage and output stage current will increase during the ignition ramp until excessive currents occur or the resonant inductor saturates. In order to detect this, the IC performs an additional measurement of the VS pin during the entire on-time of the low-side MOSFET. This voltage at the VS pin during the on-time of LO is given by the low-side MOSFET current, and therefore the output stage current, flowing through the on-resistance (RDSon) of the low-side MOSFET. Sensing the half-bridge current in this way eliminates the need for an external current-sensing resistor and additional current-sensing pin on the IC. The RDSon of the low-side MOSFET serves as the current-sensing resistor and VS serves as the current sensing pin on the IC. An internal high-voltage MOSFET is turned on when VS is low (the low-side MOSFET is "on") to let the voltage measure through to the low-side circuitry for performing the current sensing, and is turned off during the rest of the switching cycle for withstanding the high-voltage when VS is equal to the DC bus voltage (high-side MOSFET is "on"). Since the RDSon has a positive temperature coefficient, the IC performs an internal crest factor measurement for detecting excessive dangerous currents or inductor saturation which can occur during a lamp non-strike fault condition.

Performing the crest factor measurement provides a relative current measurement which cancels temperature and/or tolerance variations of the RDSon of the low-side half-bridge MOSFET. Should the peak current exceed the average current by a factor of 4 times for 10 switching cycles of LO, during the on-time of LO, the IC will enter Fault Mode and both gate driver outputs will be latched "low". To reset the IC back to preheat mode, VCC is then recycled below and above the internal UVLO thresholds, or the DIM pin reduced below 1V and then raised above 1V again.

Should an open filament lamp fault occur, hard-switching will occur at the half-bridge. The non-ZVS circuit will detect this condition and since there is no load and consequently hard-switching will occur over the entire frequency range, the frequency will increase to maximum. When FMAX is reached the IC will enter Fault Mode, requiring the system to go to UVLO or the DIM pin to be reduced below 1V, in order to restart.

Although the present invention has been described in relation to particular embodiments thereof, many other variations and modifications and other uses will become apparent to those skilled in the art. Therefore, the present invention is not limited by the specific disclosure herein.

What is claimed is:

1. A circuit for driving a switching half bridge to supply power to a load, the circuit comprising:
   a half bridge driver for supplying control signals to the half bridge;
   a switching control circuit comprising a voltage controlled oscillator (VCO) having an internally set minimum frequency and coupled to the half bridge driver for controlling the half bridge driver to supply signals to the half bridge; and
   a dimming circuit coupled to the VCO for receiving a dimming control voltage, and in response, controlling an input voltage to said VCO and thereby influencing an output power of said half bridge;
   wherein said circuit is comprised in an integrated circuit, and said dimming control voltage is applied to a dimming pin of said integrated circuit: and
   wherein said integrated circuit has only eight pins including said dimming pin.

2. A method for controlling an electronic ballast circuit to deliver power to a load, comprising:
   driving a switching half bridge with a half bridge driver controlled by a switching control circuit comprising a voltage controlled oscillator (VCO) having an internal reference for setting a frequency of said VCO, to supply power to the load;
   dimming said load by receiving a dimming control voltage, and in response, controlling an input voltage to said VCO and thereby influencing an output power of said half bridge;
   wherein said circuit is comprised in an integrated circuit, and said dimming control voltage is applied to a dimming pin of said integrated circuit: and
   wherein said integrated circuit has only eight pins including said dimming pin.

3. A circuit for driving a switching half bridge to supply power to a load, the circuit comprising:
   a half bridge driver for supplying control signals to the half bridge;
   a switching control circuit comprising a voltage controlled oscillator (VCO) having an internally set frequency and coupled to the half bridge driver for controlling the half bridge driver to supply signals to the half bridge; and
   a dimming circuit coupled to the VCO for controlling an input voltage to said VCO and thereby influencing an output power of said half bridge,
   wherein said dimming circuit is operable for applying a phase shift over a predetermined range of a dimming control voltage to said dimming circuit.

4. The circuit of claim 3, wherein said switching control circuit shuts off in response to the dimming control voltage going below said predetermined range.

5. The circuit of claim 4, wherein said switching control circuit restarts in response to the dimming control voltage rising into said predetermined range.

6. The circuit of claim 3, wherein said circuit is comprised in an integrated circuit, and wherein said dimming control voltage is applied to a dimming pin of said integrated circuit.

7. The circuit of claim 3, further comprising a feedback circuit coupled to the half bridge driver and the switching control circuit to modify operation of the switching control circuit based on an operational value of at least one of the half bridge driver and the half bridge.

8. The circuit of claim 7, wherein said switching control circuit enters into one of a plurality of operating modes in response to said feedback circuit.

9. The circuit of claim 8, wherein one of said modes is a run mode in which said dimming circuit is enabled.

10. The circuit of claim 9, wherein said switching control circuit enters said run mode in response to an ignition condition in said load.

11. The circuit of claim 9, wherein said switching control circuit enters said run mode in response to said dimming control voltage reaching a predetermined threshold.

12. The circuit of claim 8, wherein one of said modes is a preheat and ignition mode in which said dimming circuit is disabled.

13. The circuit according to claim 7, further comprising a current source coupled to an input of the switching control circuit and selectively controllable by the feedback circuit to influence operation of the switching control circuit.

14. The circuit according to claim 3, wherein said internally set frequency is a minimum frequency of said VCO.

15. A circuit for driving a switching half bridge to supply power to a load, the circuit comprising:
   a half bridge driver for supplying control signals to the half bridge;
   a switching control circuit comprising a voltage controlled oscillator (VCO) having an internally set frequency and coupled to the half bridge driver for controlling the half bridge driver to supply signals to the half bridge;
   a dimming circuit coupled to the VCO for controlling an input voltage to said VCO and thereby influencing an output power of said half bridge; and
   fault detection circuitry coupled to the half bridge driver and a feedback circuit for disabling outputs of the half bridge driver in response to at least one of excessive current drawn by the load, an open filament in the load, and non-zero voltage switching in the half bridge.

16. The circuit of claim 15, wherein said feedback circuit detects a voltage at an output of said half bridge.

17. The circuit of claim 16, wherein said feedback circuit detects a current as a function of said detected voltage.

18. The circuit according to claim 15, wherein the excessive current is determined as a peak current value being a multiple of an average current value for a specified period of time.

19. A circuit for drivina a switching half bridge to supply power to a load, the circuit comprising:
   a half bridge driver for supplying control signals to the half bridge:
   a switching control circuit comprising a voltage controlled oscillator (VCO) having an internally set frequency and coupled to the half bridge driver for controlling the half bridge driver to supply signals to the half bridge;
   a dimming circuit coupled to the VCO for controlling an input voltage to said VCO and thereby influencing an output power of said half bridge;
   a feedback circuit coupled to the half bridge driver and the switching control circuit to modify operation of the switching control circuit based on an operational value of at least one of the half bridae driver and the half bridge; and
   a high voltage switch in the feedback circuit for sensing an output value of the half bridge driver.

20. A circuit for driving a switching half bridge to supply power to a load, the circuit comprising:
- a half bridge driver for supplying control signals to the half bridge;
- a switching control circuit comprising a voltage controlled oscillator (VCO) having an internally set frequency and coupled to the half bridge driver for controlling the half bridge driver to supply signals to the half bridge; and
- a dimming circuit coupled to the VCO for controlling an input voltage to said VCO and thereby influencing an output power of said half bridge,
- wherein said dimming circuit is operable for applying a phase shift over a predetermined range of a dimming control voltage to said dimming circuit,
- wherein said circuit is comprised in an integrated circuit, and wherein said dimming control voltage is applied to a dimming pin of said integrated circuit, and
- wherein said integrated circuit has only eight pins including said dimming pin.

21. A circuit for driving a switching half bridge to supply power to a load, the circuit comprising:
- a half bridge driver for supplying control signals to the half bridge;
- a switching control circuit comprising a voltage controlled oscillator (VCO) having an internally set frequency and coupled to the half bridge driver for controlling the half bridge driver to supply signals to the half bridge; and
- a dimming circuit coupled to the VCO for controlling an input voltage to said VCO and thereby influencing an output power of said half bridge,
- wherein said internally set frequency is set such that the output voltage and output current of said half bridge are approximately in phase.

22. A circuit for driving a switching half bridge to supply power to a load, the circuit comprising:
- a half bridge driver for supplying control signals to the half bridge;
- a switching control circuit comprising a voltage controlled oscillator (VCO) having an internally set frequency and coupled to the half bridge driver for controlling the half bridge driver to supply signals to the half bridge;
- a dimming circuit coupled to the VCO for controlling an input voltage to said VCO and thereby influencing an output power of said half bridge; and
- adaptive control circuitry in a feedback circuit for influencing the switching control circuit to obtain zero volt switching and minimum current switching at the half bridge.

23. A method for controlling an electronic ballast circuit to deliver power to a load, comprising the steps of:
- driving a switching half bridge with a half bridge driver controlled by a switching control circuit comprising a voltage controlled oscillator (VCO) having an internally set frequency. to supply power to the load;
- dimming said load by controlling an input voltage to said VCO and thereby influencing an output power of said half bridge, and
- applying a phase shift over a predetermined range of a dimming control voltage to said dimming circuit.
- wherein said circuit is comprised in an integrated circuit, and wherein said dimming control voltage is applied to a dimming pin of said integrated circuit, and
- wherein said integrated circuit has only eight pins including said dimming pin.

24. A method for controlling an electronic ballast circuit to deliver power to a load, comprising the steps of:
- driving a switching half bridge with a half bridge driver controlled by a switching control circuit comprising a voltage controlled oscillator (VCO) having an internally set frequency, to supply power to the load;
- dimming said load by controlling an input voltage to said VCO and thereby influencing an output power of said half bridge;
- sensing a half bridge or half bridge driver operational parameter;
- determining a feedback control based on the sensed parameter;
- applying the feedback control to influence control of the half bridge; and
- sensing an output value of the half bridge driver.

25. A method for controlling an electronic ballast circuit to deliver power to a load, comprising the steps of :
- driving a switching half bridge with a half bridge driver controlled by a switching control circuit comprising a voltage controlled oscillator (VCO) having an internally set frequency, to supply power to the load;
- dimming said load by controlling an input voltage to said VCO and thereby influencing an output power of said half bridge; and
- applying a phase shift over a predetermined range of a dimming control voltage to said dimming circuit.

26. The method of claim 25, wherein said switching control circuit shuts off in response to the dimming control voltage going below said predetermined range.

27. The method of claim 26, wherein said switching control circuit restarts in response to the dimming control voltage rising into said predetermined range.

28. The method of claim 25, wherein said circuit is comprised in an integrated circuit, and wherein said dimming control voltage is applied to a dimming pin of said integrated circuit.

29. The method of claim 25, further comprising the steps of:
- sensing a half bridge or half bridge driver operational parameter;
- determining a feedback control based on the sensed parameter;
- applying the feedback control to influence control of the half bridge.

30. The method of claim 29, wherein said switching control circuit enters into one of a plurality of operating modes in response to said feedback control.

31. The method of claim 30, wherein one of said modes is a run mode in which said dimming step is enabled.

32. The method of claim 31, wherein said switching control circuit enters said run mode in response to an ignition condition in said load.

33. The method of claim 31, wherein said switching control circuit enters said run mode in response to said dimming control voltage reaching a predetermined threshold.

34. The method of claim 30, wherein one of said modes is a preheat and ignition mode in which said dimming step is disabled.

35. The method of claim 29, further comprising selectively controlling a current source coupled to an input of the switching control circuit by the feedback control, to influence operation of the switching control circuit.

36. The method of claim 25, wherein said internally set frequency is a minimum frequency of said VCO.

37. The method of claim 25, further comprising setting a minimum frequency of said VCO.

38. A method for controlling an electronic ballast circuit to deliver power to a load, comprising the steps of:

driving a switching half bridge with a half bridge driver controlled by a switching control circuit comprising a voltage controlled oscillator (VCO) having an internally set frequency, to supply power to the load;

dimming said load by controlling an input voltage to said VCO and thereby influencing an output power of said half bridge;

applying a phase shift over a predetermined range of a dimming control voltage to said dimming circuit; and setting a minimum frequency of said VCO;

said setting step being performed when said dimming control voltage is within said predetermined range.

39. A method for controlling an electronic ballast circuit to deliver power to a load, comprising the steps of:

driving a switching half bridge with a half bridge driver controlled by a switching control circuit comprising a voltage controlled oscillator (VCO) having an internally set frequency, to supply power to the load;

dimming said load by controlling an input voltage to said VCO and thereby influencing an output power of said half bridge; and setting a minimum frequency of said VCO, wherein said internally set frequency is set such that the output voltage and output current of said half bridge are approximately in phase.

* * * * *